(12) United States Patent
Foth et al.

(10) Patent No.: US 6,925,450 B2
(45) Date of Patent: Aug. 2, 2005

(54) METHOD AND SYSTEM FOR PAYMENT OF PERMIT MAIL

(75) Inventors: Thomas J. Foth, Trumbull, CT (US); Amy E. Harris, Westport, CT (US); Richard W. Heiden, Huntington, CT (US)

(73) Assignee: Pitney Bowes Inc., Stamford, CT (US)

( * ) Notice: Subject to any disclaimer, the term of this patent is extended or adjusted under 35 U.S.C. 154(b) by 305 days.

(21) Appl. No.: 10/137,471

(22) Filed: Apr. 30, 2002

(65) Prior Publication Data

US 2003/0074333 A1 Apr. 17, 2003

Related U.S. Application Data

(60) Provisional application No. 60/329,741, filed on Oct. 16, 2001, now abandoned.

(51) Int. Cl.⁷ .............................................. G06F 17/60
(52) U.S. Cl. ........................................ 705/404; 705/39
(58) Field of Search ........................ 705/39, 401, 402, 705/404

(56) References Cited

U.S. PATENT DOCUMENTS

| | | | | |
|---|---|---|---|---|
| 4,511,793 A | * | 4/1985 | Racanelli | 705/404 |
| 5,019,991 A | | 5/1991 | Sansone et al. | 705/407 |
| 5,051,914 A | | 9/1991 | Sansone et al. | 700/223 |
| 5,239,168 A | | 8/1993 | Durst, Jr. et al. | 235/432 |
| 5,283,829 A | | 2/1994 | Anderson | |
| 5,475,603 A | | 12/1995 | Korowotny | 700/213 |
| 5,717,596 A | | 2/1998 | Bernard et al. | 705/404 |
| 6,052,675 A | | 4/2000 | Checchio | |
| 6,108,643 A | * | 8/2000 | Sansone | 705/62 |
| 6,188,996 B1 | * | 2/2001 | Sansone | 705/408 |
| 6,405,182 B1 | | 6/2002 | Cuervo | |
| 2003/0080183 A1 | | 5/2003 | Rajasekaran et al. | 235/379 |

FOREIGN PATENT DOCUMENTS

FR 2665003 1/1992

OTHER PUBLICATIONS

PR Newswire: "Beat the Postal Increase with Postagepro (TM)", Nov. 30, 1994, retrieved from Dialog, Dialog No.: 0766641.

* cited by examiner

Primary Examiner—Edward R. Cosimano
(74) Attorney, Agent, or Firm—Brian A. Lemm; Angelo N. Chaclas

(57) ABSTRACT

A system and method that allows mailers of all sizes to pay for permit mail without presenting cash or a check at the time of induction is provided. A permit payment aggregator establishes a master account with the postal system for the payment of permit mail. A plurality of mailers each establish a separate account with the permit payment aggregator and transfer control of payment of mail inducted under their respective permit imprints to the permit payment aggregator. When the mailer desires to send a mailing, a request for payment of postage is made to the permit payment aggregator, which processes the information related to the mailing. The induction site communicates with the permit payment aggregator and the mailing as presented is compared with the information processed by the permit payment aggregator. If the mailing is accepted, the master account is debited for payment.

69 Claims, 4 Drawing Sheets

METHOD AND SYSTEM FOR PAYMENT OF PERMIT MAIL

CROSS-REFERENCE TO RELATED APPLICATIONS

This application claims priority from U.S. Provisional Application Ser. No. 60/329,741, filed on Oct. 16, 2001, now abandoned, the specification of which is hereby incorporated by reference.

FIELD OF THE INVENTION

The invention disclosed herein relates generally to the field of mailing systems, and more particularly to a system and method for payment of permit mail.

BACKGROUND OF THE INVENTION

There are currently several methods of paying the postal service for collecting, sorting and distributing the mail. For example, mailers may pay the post office for services provided by purchasing a stamp, i.e., a printed adhesive label, issued by the post office at specified prices, that is affixed to the mailpiece to show prepayment of postage. The placing of one or more stamps on a mailpiece can be labor intensive, however, especially for mailers having large volumes of mail.

Another method for paying for postal services is by permit mail. Permit mail is especially suited for mailers that have large volumes of mail. With permit mail, instead of using stamps, the mailer prints a permit imprint, known as an indicia, on each mailpiece. The permit mail is brought to a postal induction site, referred to by the United States Postal Service (USPS) as a Bulk Mail Entry Unit (BMEU), by the mailer, or an agent of the mailer. The mailer also prepares forms indicating the number of mailpieces in the mailing and the amount of postage estimated to be due. For manifest mail, a sampling of the mailing is performed at the induction site for comparison with the manifest provided by the mailer to determine the accuracy of the estimates made by the mailer. For uniform mail (mail of uniform size and weight), the number of mailpieces in the mailing is verified by the postal authority. For example, ten mailpieces are weighed and the average single piece weight, based on the ten mailpieces actually weighed, is determined. The entire mailing is then weighed, and the total weight is divided by the average single piece weight to determine the total number of mailpieces in the mailing. The postage due is then calculated based on the average single piece weight and the total number of mailpieces as determined by the postal authority. The mailer, or his agent, must provide payment for the total amount of postage due as determined by the postal authority. Such payment can be, for example, in the form of a check, cash, uncancelled stamps, or debit from a trust account into which money must be wired. The USPS also provides certain mailers with a postage payment system referred to as the Centralized Account Processing System (CAPS), which provides electronic options to presenting checks or cash in person. CAPS utilizes either a centralized trust account, in which funds are deposited electronically, via standard Automated Clearing House (ACH) banking mechanisms, to the CAPS bank prior to inducting the mailing, or a centralized debit account, in which the mailer's designated bank account will be debited, via standard ACH banking mechanisms, for the total of the day's mailings on the next business day.

There are problems, however, with the conventional systems for paying for permit mail. For example, if the mailer is paying by cash, check, or uncancelled stamps, payment must be presented at the time the mailing is inducted by the postal authority. Accordingly, the mailer must have either the correct amount of cash or uncancelled stamps, or a check for the correct amount, as determined by the verification or comparison performed by the postal authority. Typically, if there is a discrepancy less than some predetermined threshold, such as, for example, 1.5%, the postal authority will accept the amount of the payment as estimated by the mailer. However, if the discrepancy between what the mailer estimated as the amount of postage believed to be due and the amount due as calculated by the postal authority is greater than the threshold limit defined by the postal authority, the mailer may either have insufficient cash or uncancelled stamps to pay for the mailing, or a check for the incorrect amount, i.e., either more or less than required. Discrepancies are fairly common, especially for uniform mailings having thousands, or tens of thousands, of mailpieces. With such large mailings, the entire mailing is weighed by rolling carts, including the trays containing the mailpieces, onto a large scale, and then subtracting a standardized weight for the carts and trays, to determine the total weight of the mailing. The weight of the carts and trays typically changes over time, as labels may be added, pieces may be missing, etc. Thus, it is quite possible that a discrepancy will occur due to the inherent inaccuracy of such a system. In addition, if the mailer failed to prepare the mail appropriately for claimed discounts, such as, for example, improperly sorting the mail or not providing readable barcodes on each piece, the postage amount for the mailing will be upgraded to reflect the true nature of the mailing and any discounts. If the delivery person for the mailer does not have the authority to draft a new check for the correct amount, either higher or lower, or immediate access to additional cash or uncancelled stamps to pay the postage due if higher than estimated by the mailer, the mailing will be rejected. There is also an issue with the security of the cash, uncancelled stamps, or check if the party leaving the mailing at the USPS cannot be completely trusted (perhaps because the party delivering the mailing is simply a third party courier).

In addition to the above problems, payment in the form of cash or a check adds processing costs for the postal authority. For example, it takes additional time and expenses to record and account for payments made in this manner. Since funds are collected in a distributed fashion, it is possible for funds to get misplaced and/or checks to get lost.

To overcome the above problems, the USPS utilizes CAPS as previously described. While CAPS may have alleviated some of the problems, several still remain. For example, there are several thresholds that a mailer must meet to qualify for CAPS, such as, for example, a minimum amount of postage each year. For example, to qualify for CAPS, a mailer currently must have a permit account with a minimum of $500,000 of postage each year. Alternatively, a mailer can have three permits in two or more postal locations with a minimum of $10,000 of postage per year, or three or more permits at one post office with a minimum of $50,000 postage per year. Many businesses and home offices currently do not meet any of these requirements, and therefore do not qualify for CAPS. Even if the thresholds were removed so all mailers would qualify for CAPS, several problems would still remain. For example, if large numbers of mailers utilized CAPS, there would be additional expenses for the postal authority to maintain and service the large number of CAPS accounts.

Additionally, from the mailer's perspective, CAPS also has limitations. For example, with the centralized trust account, the funds for payment of the postage must be deposited prior to the induction of the mail, thereby tying up funds in a non-interest bearing account. With the centralized debit account, some mailers are reluctant to provide their banking information to the USPS and other suppliers. With the use of either the centralized trust account or the centralized debit account, additional record keeping is necessary to reconcile the amount debited or charged by the postal authority. Furthermore, the USPS is not permitted to grant credit to a mailer or pay interest on deposits, thereby making it necessary for the mailer to ensure that correct amounts are available in their account or risk a mailing being rejected. Such rejections result in delays of the mailpieces being sent, which could cost the mailer significant amounts in both money and customers.

Thus, there exists a need for a trusted system and method that allows mailers of all sizes to pay for permit mail without presenting cash, uncancelled stamps, or a check at the time of induction, thus ensuring that a mailing is inducted when the mailer desires. Additionally, there is a need for a system and method that provides mailers with payment options, such as, for example, a credit line or an interest bearing account, to pay for permit mail, reduces the amount of record keeping for both mailers and the postal authority, and provides mailers with additional resources to manage their funds more effectively.

SUMMARY OF THE INVENTION

The present invention alleviates the problems associated with the prior art and provides a trusted system and method that allows mailers of all sizes to pay for permit mail without presenting cash, uncancelled stamps, or a check at the time of induction, thus ensuring that a mailing is inducted when the mailer desires, reduces the amount of record keeping for both mailers and the postal authority, provides mailers with additional resources to manage their funds more effectively, and reduces USPS operating costs, including, for example, check processing costs.

In accordance with the present invention, a permit payment aggregator establishes a master account (may be a master CAPS account in the U.S.) with the postal system for the payment of permit mail. A plurality of mailers each establish a separate account with the permit payment aggregator and transfer control of payment of mail inducted under their respective permit imprints to the permit payment aggregator. The account could be set up, for example, as an interest bearing or non-interest bearing deposit account for each mailer from which funds may be used to pay the postage for permit mail sent by each mailer. Additionally, the permit payment aggregator could establish a credit line for each mailer. When the mailer decides to send a mailing, a request for payment of postage on behalf of the mailer is made to the permit payment aggregator. The request includes information related to the mailing, such as, for example, the induction site where the mailing will be inducted, the permit imprint number under which the mail will be inducted, a range of dates during which the mail will be inducted, the number of pieces of mail to be inducted, the estimated cost of the mailing, and the return address on the mailing. The mailer authorizes the permit payment aggregator to provide the postal system with payment for the mailing on the mailer's behalf based on this information. The permit payment aggregator processes the information related to the mailing and issues a payment authorization number (PAN) for the mailing for security purposes. The PAN may be cryptographically generated over a sufficiently wide range of integer values such that it would be difficult for an unauthorized party to guess the number assigned to a mailing with the attributes previously specified (induction site, permit imprint number, dates of induction, number of mail pieces, cost of mailing, and return address).

The mailing, along with the PAN, is then taken to the induction site, either by the mailer or an agent of the mailer, and the PAN is communicated to the postal clerk for induction. The induction site may then validate the PAN by communicating with the permit payment aggregator and comparing the information related to the mailing as processed by the permit payment aggregator with the mailing as presented for induction. If there is a discrepancy between the mailing as presented and the information related to the mailing as processed by the permit payment aggregator, the mailing is rejected by the induction site. If there are no discrepancies, or alternatively if any discrepancies are resolved, the mailing is accepted by the induction site. The permit payment aggregator provides notification to the mailer that the mailing has been accepted, and the postal service debits the master CAPS account of the permit payment aggregator for the payment of the mailer's mailing.

The present invention provides mailers with multiple payment options for permit mail including "Just-In-Time" payments, "Pay In Advance" payments, and/or "Pay In Arrears" payments. The "Just-In-Time" payment option allows the mailer to pay the permit payment aggregator at the time of the mailing. The "Pay In Arrears" payment option provides the mailer with a credit line to pay for permit mail. The "Pay In Advance" payment option may provide mailers with interest on pre-paid permit mail.

The present invention also allows for a "buyer-direct" payment model whereby the mailer initiates the payment directly to a trusted third party permit payment aggregator, who then settles with the USPS, or an "agent authorized" model whereby the "agent" of the mailer/buyer initiates the initial payment request on behalf of the mailer/buyer and the mailer/buyer approves the request.

All of the payment solutions of the present invention allow the mailer (the permit payment aggregator's customer) to view all of their account detail online, including historical payment information by permit number, initiate on-line payments, and initiate and approve on-line authorizations. Customers can make payments to the permit payment aggregator in a number of ways, including, for example, via check, ACH credit or debit or wire.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
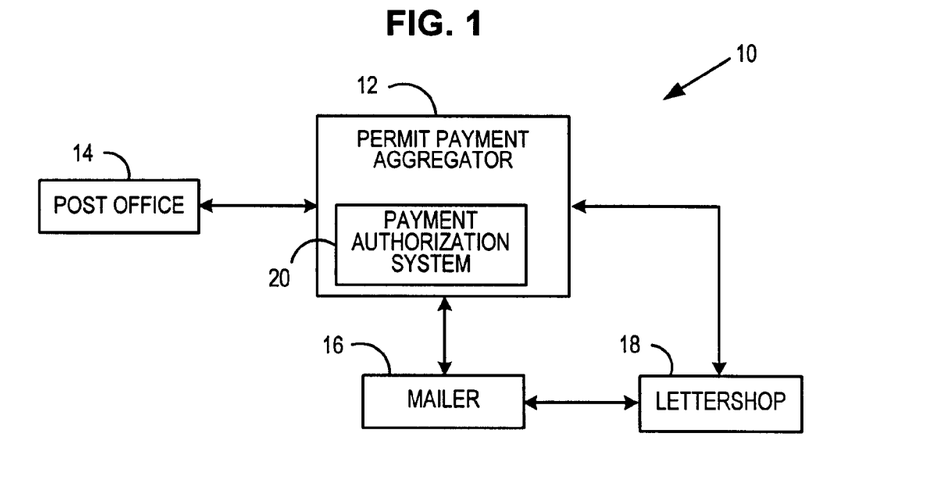
FIG. 1 illustrates in block diagram form a system for payment of permit mail according to the present invention.

In describing the present invention, reference is made to the drawings, wherein there is seen in FIG. 1 a system 10 for payment of permit mail according to the present invention. System 10 includes a permit payment aggregator 12, which maintains a payment account, such as CAPS, with the post office 14. Permit payment aggregator 12 enables mailers, such as mailer 16, to participate in programs such as CAPS, regardless of whether mailer 16 meets the threshold criteria for CAPS by aggregating a plurality of mailers under a master account held by permit payment aggregator 12. Additionally, system 10 may include a lettershop 18 that produces the permit mail for mailer 16. Lettershop 18 may be a third party separate from mailer 16 or may be a mail department within mailer 16.

Figure 2:
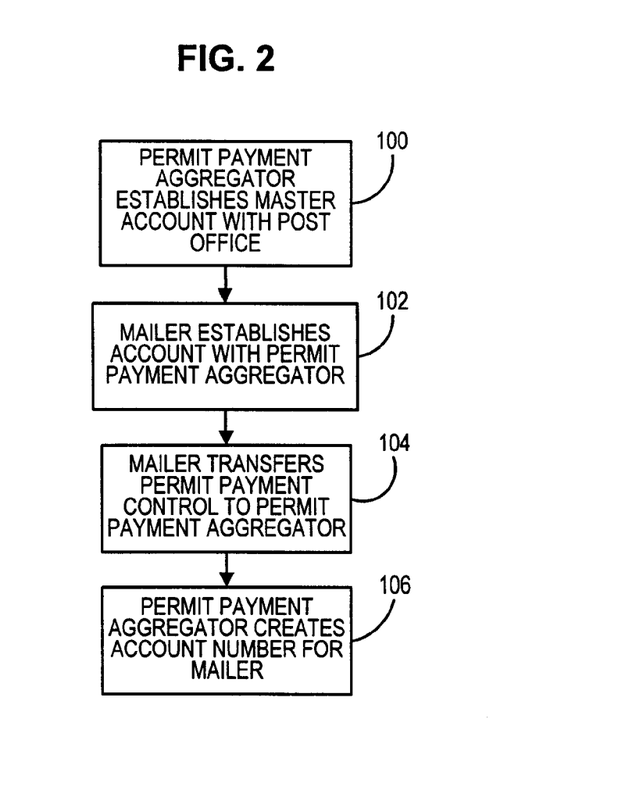
FIG. 2 illustrates in flow diagram form a process for payment of permit mail according to the present invention.

The operation of system 10 will be described with respect to the process flow diagrams illustrated in FIGS. 2, 3A and 3B. Referring now to FIG. 2, in step 100 the permit payment aggregator 12 establishes a master account with the post office 14, such as, for example, a CAPS account. It should be noted that while permit payment aggregator 12 may not actually be registered for any permit imprints, permit payment aggregator will qualify for a CAPS account based on an aggregation of permit imprints for mailers, such as mailer 16, that will utilize the system 10. It should be understood, of course, that permit payment aggregator 12 may also have its own registered permit number under which mailings may be sent.

Figure 4:
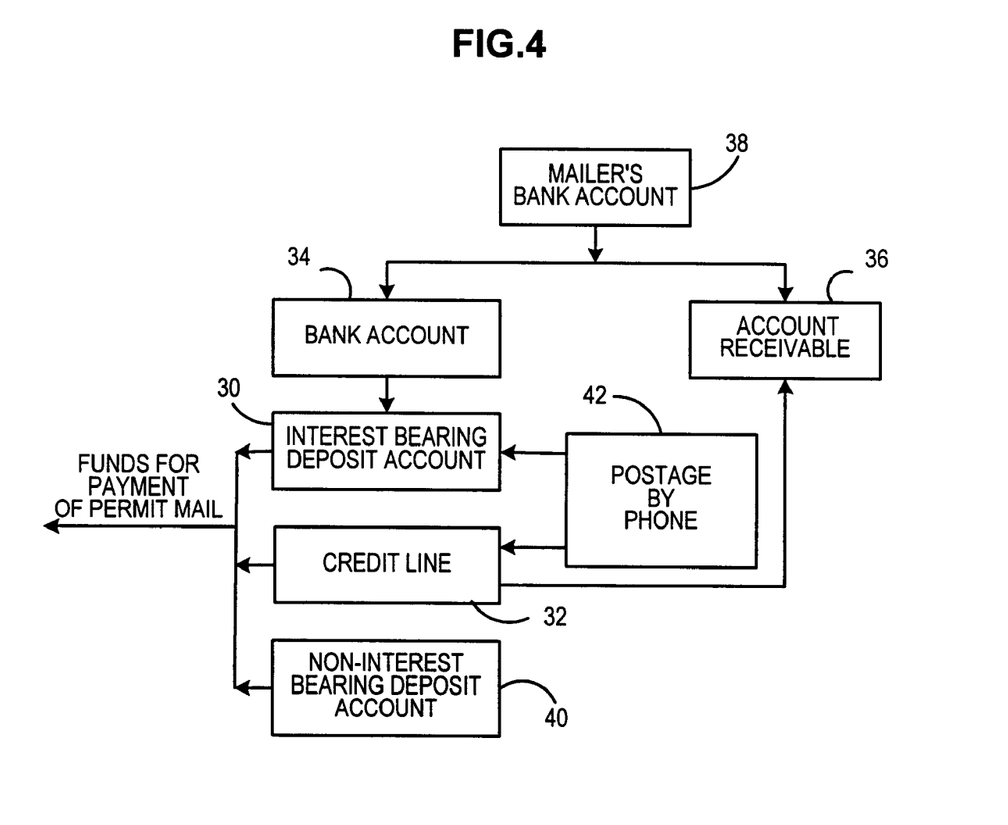
FIG. 4 illustrates in block diagram form an exemplary account for payment of permit mail according to the present invention.

In step 102, a mailer 16 establishes an account with the permit payment aggregator 12 to provide services related to payment for permit mail. This account for mailer 16 can be established in a number of different ways as illustrated in FIG. 4. Permit payment aggregator 12 can establish an interest bearing deposit account 30 and/or a non-interest bearing deposit account 40 for mailer 16 from which funds may be used to pay the postage for permit mail sent by mailer 16. Interest bearing deposit account 30 allows the mailer 16 to accumulate interest on any funds deposited in interest bearing deposit account 30. Funds for the interest bearing deposit account 30 or non-interest bearing deposit account 40 for mailer 16 can be provided by transferring funds, in any convenient manner, such as, for example, by wire transfer, check, ACH credit, etc., from the mailer's bank account 38 to a bank account 34 of permit payment aggregator 12. These funds are then transferred to the interest bearing deposit account 30 or non-interest bearing deposit account 40. Alternatively to, or in addition to, interest bearing deposit account 30 and/or non-interest bearing deposit account 40, permit payment aggregator 12 could also establish a credit line 32 for mailer 16 if desired. Payments for permit mail made via the credit line 32 are billed to the mailer 16 by the accounts receivable department 36 of permit payment aggregator 12, which then receives payment from the mailer, typically from the mailer's bank account 38. Additionally, the interest bearing deposit account 30, non-interest bearing deposit account 40 and/or credit line 32 could be maintained by mailer 16 utilizing a dial-up system, such as, for example, Postageby-Phone® 42 from Pitney Bowes. Thus, the present invention provides mailer 16 with multiple payment options for permit mail including "Just-In-Time" payments, "Pay In Advance" payments, and/or "Pay In Arrears" payments. The "Just-In-Time" payment option allows the mailer 16 to pay the permit payment aggregator at the time of the mailing. The "Pay In Arrears" payment option provides the mailer 16 with a credit line 32 to pay for permit mail. The "Pay In Advance" payment option may provide mailer 16 with interest on pre-paid permit mail. All of the payment solutions of the present invention allow the mailer 16 to view all of their account detail on-line via a remote computer coupled to a network, such as, for example, the Internet. Account details include, for example, historical payment information by permit number, initiate on-line payments, and initiate and approve on-line authorizations.

Referring again to FIG. 2, in step 104 the mailer 16 transfers responsibility for payment of mail inducted under its permit, issued by the post office 14, to permit payment aggregator 12. Thus, permit payment aggregator 12 will be authorized to pay for mail inducted under the permit number assigned to mailer 16 utilizing the master account established by permit payment aggregator 12 in step 100. Although mailer 16 individually may not meet any of the threshold requirements to qualify for CAPS, permit payment aggregator 12, by aggregating a plurality of mailers under the single master account established in step 100, will exceed the threshold requirements thereby allowing each of the plurality of mailers to utilize CAPS. Additionally, system 10 provides mailer 16 with additional payment options and ways to better utilize their funds, while also decreasing the amount of record keeping, processing and costs for the post office 14 as will be further described below.

In step 106, the permit payment aggregator 12 establishes a customer account number for mailer 16. This may be established by combining the permit number for mailer 16 and the zip code of the induction site of the post office 14 where the mail will be inducted. When a permit imprint is established by the post office 14, the mailer 16 must select an induction site, such as a BMEU, to which the permit mail will be brought for induction into the mail system. All induction sites have unique zip codes. The permit mail for that assigned permit imprint number can not be inducted into the mail system at any other location. Thus, although permit imprint numbers may repeat, they only repeat at different postal locations. By combining the permit imprint number and the zip code of the induction site for mailer 16, an account number will be generated that uniquely identifies mailer 16 and the corresponding permit imprint number. Thus, even if mailer 16 has multiple permit imprint numbers or utilizes multiple induction sites, a unique account number will be generated for each permit number. Of course, if mailer 16 has multiple permit imprint numbers or utilizes more than one induction site, permit payment aggregator 12 could establish a single master account for mailer 16 which maps to each of the accounts for the individual permit imprint numbers or induction sites. The account number for mailer 16 is utilized to track postage purchases for permit mail as described below.

Figure 3A:
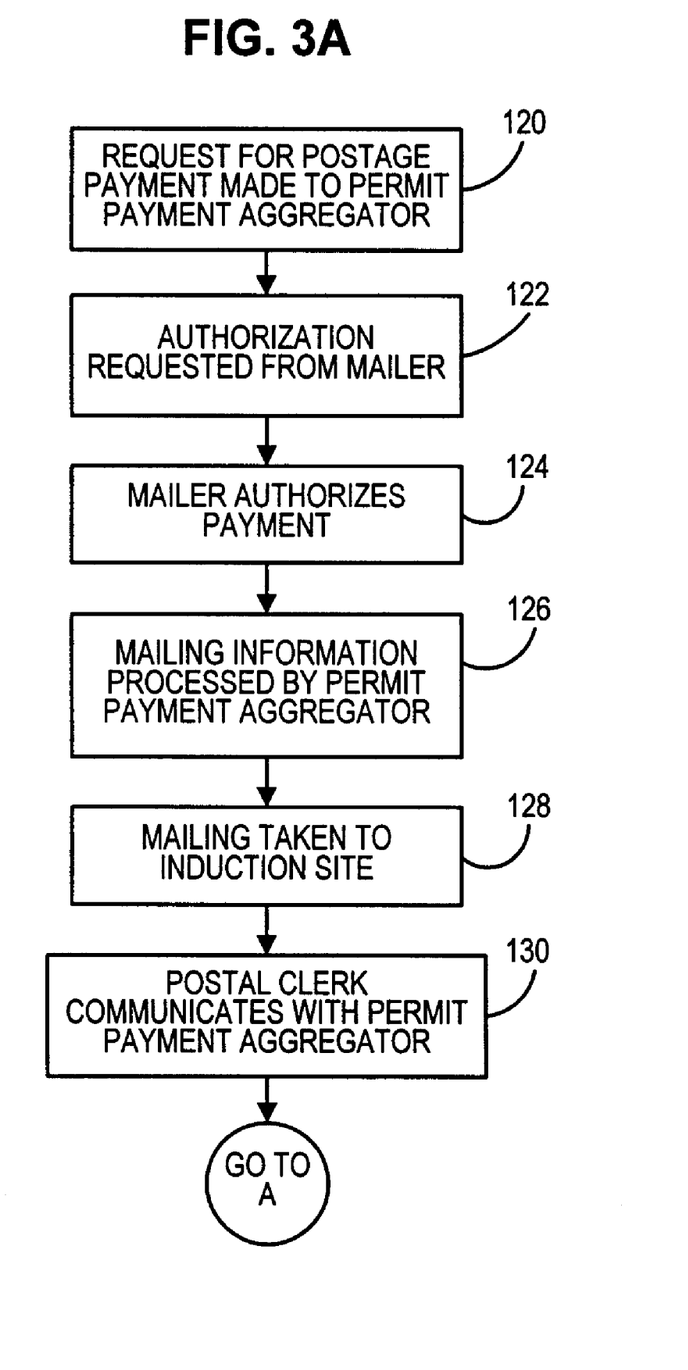
FIGS. 3A and 3B illustrate in flow diagram form further processing for the payment of permit mail according to the present invention.
Figure 3B:
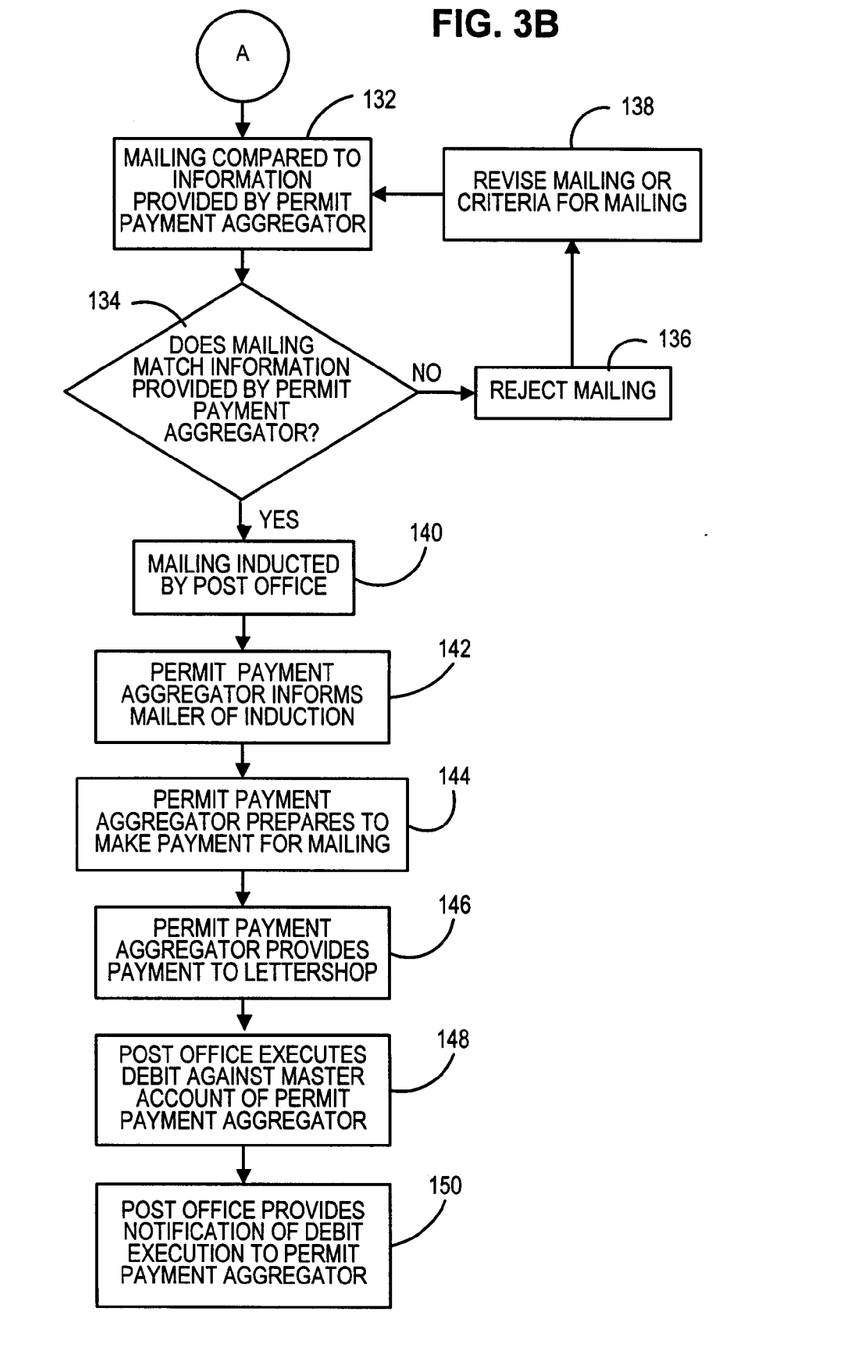

Referring now to FIGS. 3A and 3B, there is illustrated in flow diagram form the processing of a mailing utilizing system 10. Suppose, for example, mailer 16 decides to send a mailing. In step 120, a request for payment of postage is made to the permit payment aggregator 12. This request can be made directly by the mailer 16, i.e., a "buyer-direct" payment model, or alternatively, if mailer 16 utilizes a third party, such as lettershop 18, to print and prepare the mailing, from the third party, i.e., an "agent authorized" payment model. The request includes information related to the mailing, such as, for example, the induction site where the mailing will be inducted, the permit imprint number under which the mail will be inducted, a range of dates during which the mail will be inducted, the number of pieces (or a maximum number of pieces) of mail to be inducted, the estimated cost of the mailing, and the return address on the mailing. If lettershop 18 is used to prepare the mail, the request could also include the production costs incurred by lettershop 18 to prepare the mailing.

In step 122, permit payment aggregator 12 requests mailer 16 to authorize payment of the mailing based on the information received in step 120. According to the present invention, permit payment aggregator 12 also provides the mailer 16 with a "not to exceed" price for the mailing based on statistics and other information related to discrepancies between previous estimated cost of mailings and the actual cost of the mailings. This allows the mailer 16 to pre-authorize an increase in the cost, as long as the cost does not exceed the specified limit, should a discrepancy be found. This eliminates the need for the mailer 16 to be contacted if a slight discrepancy is found, which could unnecessarily delay induction of the mail. Of course, if desired, mailer 16 could also change the "not to exceed" cost provided by permit payment aggregator 12 to a higher or lower level or the mailer can specify a percentage of the total estimated cost to add to the estimated postage costs to derive a "not to exceed" price.

In step 124, the mailer provides authorization for payment associated with the mailing. Such authorization could be provided, for example, by telephone, via a web page operated by permit payment aggregator 12 and accessed by mailer 16, facsimile, e-mail, etc. With respect to responses by telephone, it should be noted that mailer 16 could provide authorization utilizing a voice recognition unit (VRU). Of course, if the mailer 16 is making the request for payment of postage, then such authorization could be given along with the request in step 120 and thus steps 122 and 124 may not need to be performed.

Once authorization for payment has been provided by mailer 16, in step 126 the information related to the mailing is processed by permit payment aggregator 12. According to one embodiment of the invention, processing includes the generation of a Payment Authorization Number (PAN) by a payment authorization system 20 (FIG. 1). The PAN can be, for example, a randomly or cryptographically generated number that is linked to information that identifies the mailing for which the mailer 16 has authorized payment. The information includes, for example, the induction site where the mailing will be inducted, the permit imprint number under which the mail will be inducted, a range of dates during which the mail will be inducted, the number of pieces of mail to be inducted, the estimated cost of the mailing, including the "not to exceed" cost authorized by the mailer 16, and the return address on the mailing. If lettershop 18 is used to prepare the mail, the information could also include the production costs incurred by lettershop 18 to prepare the mailing.

If a lettershop 18 is being utilized to prepare multiple mailings related to the same single mailing campaign, permit payment aggregator 12 may issue multiple PANs, one for each mailing associated with the larger campaign. For example, a mailer 16 may wish to utilize lettershop 18 to prepare and send a mailing comprising 50,000 pieces; however, lettershop 18 need not send all 50,000 pieces at the same time. Accordingly, lettershop 18 may make multiple presentations of mailings, such as, for example, one mailing of 25,000 pieces, one mailing of 15,000 pieces, and one mailing of 10,000 pieces, to complete the total of 50,000 mail pieces for the entire campaign. In this situation, the information related to the mailing received in the request in step 120 will be for the entire mailing campaign, e.g., all 50,000 pieces in the above example. In step 122, permit payment aggregator 12 requests the mailer 16 to authorize payment of the entire mailing campaign, and mailer 16 will provide such authorization in step 124. Permit payment aggregator 12 will then generate a separate PAN for each induction as it relates to that campaign, e.g., one PAN for the 25,000 piece induction, one PAN for the 15,000 piece induction, and one PAN for the 10,000 piece induction. Permit payment aggregator 12 will maintain a running total of the information associated with each PAN related to the campaign to ensure that the total of all the proposed inductions for the entire mailing campaign will not exceed the limits for the mailing campaign previously authorized by the mailer 16 in step 124, such as, for example, total piece count, total cost, etc. In this manner, mailer 16 will only need to provide a single authorization instead of having to provide authorization for each of the sub-mailings associated with the entire campaign. Once an authorized limit has been reached, no further PANs will be issued for the mailing campaign until new limits are authorized by the mailer 16. Alternatively, of course, permit payment aggregator 12 can request authorization from mailer 16 for each PAN related to the campaign.

The PAN is provided to the party that will be bringing the mail to the post office 14 for induction, such as, for example, mailer 16, or alternatively, lettershop 18 if utilized by mailer 16, or a third party courier. It should be noted that the mailer 16 does not have to provide any funds to the delivery party that is delivering the mailing to the induction site. Accordingly, system 10 provides a trusted third party system for the payment of permit mail when prepared and/or delivered by someone other than the mailer 16.

According to another embodiment of the present invention, instead of generating a PAN, the information related to the mailing is simply stored by permit payment aggregator 12 in a location associated with the induction site and permit imprint number for accessing as will be described below.

In step 128, the mailing is brought to the induction site by either the mailer 16, an agent of the mailer 16, or lettershop 18, along with the PAN generated by permit payment aggregator 12. At the induction site, the PAN is presented, along with the mailing, to a postal clerk who then communicates with the permit payment aggregator 12 and provides the PAN to permit payment aggregator 12 in step 130. Such communication can be performed, for example, via telephone or a network, such as, for example, the Internet. Permit payment aggregator 12 then provides the postal clerk with the information that identifies the mailing for which the mailer 16 has authorized payment that is linked to the PAN, including, for example, the induction site where the mailing will be inducted, the permit imprint number under which the mail will be inducted, a range of dates during which the mail will be inducted, the number (or maximum number) of pieces of mail to be inducted, the estimated cost of the mailing, including the "not to exceed" cost authorized by the mailer 16, and the return address on the mailing. The postal clerk also determines the actual postage cost for the mailing (verification as previously described), and then in step 132 the postal clerk compares the mailing as presented for induction to the information provided by the permit payment aggregator 12. In step 134 it is determined if the mailing as presented meets each of the criteria provided by the permit payment aggregator 12. If in step 134 it is determined that the mailing as presented does not meet each of the criteria provided by the permit payment aggregator 12, then in step 136 the mailing is rejected by the post office 14 and not inducted into the system. For example, if the induction site where the mailing will be inducted is incorrect, or the permit imprint number under which the mail will be inducted is incorrect, or the mail is not being presented within the range of dates specified, or the number of pieces of mail to be inducted is incorrect, or the actual cost will exceed the "not to exceed" cost authorized by the mailer 16, or the return address on the mailing is incorrect, the mailing will be rejected.

Alternatively, if a PAN is not generated by permit payment aggregator 12, the postal clerk can communicate with the permit payment aggregator 12 and provide the induction site number and the permit number for the mailing as presented. Permit payment aggregator 12 can then provide all of the mailings for which payment has been authorized by mailer 16 for that induction site and permit imprint number. The clerk can select from the authorized mailings to determine if the mailing as presented meets the criteria for one of the authorized mailings.

If the mailing is rejected in step 136, because it does not meet one or more of the criteria for the mailing as provided by the permit payment aggregator 12, then according to the present invention in step 138 the mailer 16 can revise the criteria, such as, for example, the "not to exceed price" or otherwise fix the problem that caused the mailing to be rejected and re-present the mailing to the post office 14 for a new comparison in step 132. Thus, a new PAN could be immediately issued by permit payment aggregator 12, and the mail re-presented to the post office, or the mailing could be fixed to fit within the criteria specified for the original PAN. Alternatively, the mailer 16 could approve a change in the criteria stored by permit payment aggregator 12. In this case, when the mail is represented to the post office, the postal clerk would receive the revised criteria which presumably would allow the postal clerk to accept the mail.

If in step 134 it is determined that the mailing meets the criteria as provided by the permit payment aggregator 12, then in step 140 the mail is inducted into the mailing system and the clerk provides the actual piece count and the actual cost of the mailing to permit payment aggregator 12. The permit payment aggregator 12 may request further information about the mailing from the postal clerk. This information may include, for example and without limitation, information concerning the presentation of the mail and it's suitability to receive discounts from the post office. Additionally, when the mailing is inducted into the mailing system, the permit account for mailer 16, established with the post office 14 when mailer 16 applied for and received the permit imprint, is posted for the fees associated with the mailing, i.e., the fees for the associated mailing are entered against the permit account for the mailer 16 but not charged or debited from the permit account for mailer 16. Recall from step 104 of FIG. 2 that the responsibility for payment for any fees charged to the permit account for mailer 16 belongs to permit payment aggregator 12.

In step 142 the permit payment aggregator 12 provides notification to the mailer 16 that the mailing has been inducted by the post office 14, and provides the actual piece count, actual cost, and other information collected by permit payment aggregator 12 as provided by the postal clerk. Such notification could be done, for example, by an automated telephone system, facsimile, e-mail, etc. If a lettershop 18 was used, the notification can also be provided to the lettershop 18. This provides independent verification that a mailing was accepted by the post office 14 and was inducted into the mailing system on a specified date.

In step 144, the permit payment aggregator 12 prepares for payment of the mailing from the account for mailer 16. Permit payment aggregator 12 maintains a record of all authorized payments awaiting induction. Thus, when the mailer 16 authorized payment for the mailing in step 124, permit payment aggregator 12 updated this record to include this mailing. It is important to note, however, that at the time the mailer 16 provided authorization, it was not necessary to move money from the mailer's account with the permit payment aggregator 12. Thus, the mailer 16 has not occurred any type of finance charges or fees if the payment is being done utilizing the credit line 32, nor has the mailer 16 lost any interest from money being removed from the interest bearing deposit account 30. Preferably, it is not until after the notification of induction is received in step 142 that the funds needed to pay for the mailing are removed or charged against the account of mailer 16 in permit payment aggregator 12, as selected by the mailer 16, and placed in the master account that permit payment aggregator 12 holds with the post office 14.

Alternatively, the master account that permit payment aggregator 12 holds with the post office 14 could always maintain a minimum balance based on statistical normal daily transactional costs. This system, however, is not as efficient as transferring the funds into the master account just before payment is to occur, as any potential interest may be lost on the funds that remain idle in the master account.

Optionally, in step 146, if a lettershop 18 was used by mailer 16, payment can be made by permit payment aggregator 12 to lettershop 18 for production of the mailing. The use of permit payment aggregator 12 by the mailer 16 to control payment provides additional benefits to the mailer 16 as well. For example, without the present invention, if mailer 16 used a lettershop 18 to produce the mailing and deliver it to the post office 14, the mailer 16 would have to provide payment to the lettershop 18 and then trust the lettershop 18 to accurately prepare the mailing, deliver it to the post office 14 and provide the payment. According to the present invention, the mailer 16 does not have to provide any funds to the lettershop 18 for producing the mailing until after the mailing has been inducted, thereby ensuring that the lettershop 18 prepares the mailing accurately and on time. Additionally, since payment of the mailing is made directly to the post office 14, the mailer 16 does not have to provide any funds to the lettershop 18 in advance to pay for the mailing, or to an agent that is delivering the mailing to the induction site. Accordingly, system 10 provides a trusted third party system for the payment of permit mail when prepared and/or delivered by someone other than the mailer 16.

In step 148, the post office 14 executes an ACH debit against the master account that the permit payment aggregator 12 maintains with the post office 14 for the mailing from mailer 16. Typically, this is performed on the next business day after induction. Accordingly, the funds removed or charged against the account of mailer 16 in permit payment aggregator 12 in step 144 will be available in the master account that permit payment aggregator 12 maintains with the post office 14. Alternatively, the permit payment aggregator 12 may provide funds to the post office 14 by way of a wire funds transfer or by way of an ACH credit transaction which would move funds from permit payment aggregator's bank account 34 to the bank account of post office 14.

In step 150, the post office 14 may provide notification, typically via a web site accessible by permit payment aggregator 12, of confirmation of the above transaction, i.e., that a mailing was inducted via the master account for permit payment aggregator 12. The confirmation may include additional information such as, for example, the induction site, the permit number, the cost of the mailing and the actual number of pieces in the mailing. This information can be utilized by permit payment aggregator 12 to track postage payments against the record of all authorizations for payment for mailings awaiting induction that were made by mailer 16 for auditing purposes.

In accordance with another embodiment of the present invention, permit payment aggregator 12 does not need any type of PAN system 20 or keep any records of payments authorized by the mailer 16. In this embodiment, the mailer 16 need not provide any type of advance authorization to pay for the mailing. When a mailing is inducted by the post office 14 under a permit imprint for which permit payment aggregator 12 has payment responsibility, the master account held by permit payment aggregator 12 will be charged for the mailing, regardless of the cost. The permit payment aggregator 12 will then bill the costs for the mailing back to the mailer 16. This embodiment, however, is less secure as permit payment aggregator 12 will be liable for payment for mailings of any size or type and presented by any party, as long as the permit number and induction site number are correct. Thus, dishonest mailers could actually have mail inducted and paid for under a permit imprint number that was fraudulently obtained.

Thus, the system 10 of the present invention allows mailers of all sizes to pay for permit mail without presenting cash, uncancelled stamps or a check at the time of induction, thus ensuring that a mailing is inducted when the mailer desires. Additionally, the system 10 according to the present invention provides mailers with several payment options pay for permit mail, reduces the amount of record keeping for both mailers and the postal authority, and provides mailers with additional resources to manage their funds more effectively. For example, mailer 16 can utilize the CAPS system of the USPS without having to individually meet the threshold criteria for CAPS. Additionally, according to the present invention, the mailer 16 can now utilize either an interest bearing deposit account 30 or establish a credit line 32, neither of which the post office 14 currently provides. Furthermore, the system 10 according to the present invention will reduce the record keeping required by the post office 14, as now multiple mailers are aggregated under a single master account for permit payment aggregator 12. Thus, permit payment aggregator 12 must perform the bulk of the record keeping, significantly reducing the workload on the post office 14. Along with this, since the number of mailers that will pay by cash or check for permit mail will significantly decrease, so will the time and expense incurred by the post office 14 for processing those types of payments.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

What is claimed is:

1. A method for a payment service to pay a postal service for permit mail comprising the steps of:

establishing a master payment account with a postal service to pay for permit mail inducted by the postal service under a plurality of different permit imprint numbers issued to a plurality of different mailers;

establishing at least one associated mailer account for each of the plurality of mailers;

receiving, at the payment service, a request from one of the plurality of mailers for the payment service to make payment for a mailing under a permit imprint number issued to the mailer, the request including information related to the mailing;

providing the information related to the mailing to a postal service induction site for the mailing; and if the mailing is accepted by the postal service induction site, providing payment to the postal service for the mailing from the master payment account.

2. The method according to claim 1, wherein providing payment to the postal service further comprises:

transferring funds to pay for the mailing from the at least one associated mailer account for the mailer to the master payment account.

3. The method according to claim 1, wherein the at least one associated mailer account includes an interest bearing deposit account.

4. The method according to claim 1, wherein the at least one associated mailer account includes a non-interest bearing deposit account.

5. The method according to claim 1, wherein the at least one associated mailer account includes a credit account.

6. The method according to claim 1, wherein the master payment account is a Centralized Account Processing System account.

7. The method according to claim 1, wherein the information related to the mailing includes at least one of a postal service induction site where the mailing will be inducted, a permit imprint number under which the mailing will be inducted, a range of dates during which the mailing will be inducted, a number of pieces included in the mailing, an estimated cost of the mailing, and a return address on the mailing.

8. The method according to claim 1, wherein if a lettershop was used to prepare the mailing under a permit imprint number issued to the mailer, the step of providing payment for the mailing from the master payment account further comprises:

providing payment to the lettershop for preparing the mailing from the master payment account.

9. The method according to claim 1, wherein if the mailing is accepted by the postal service induction site, the method further comprises:

receiving, at the payment service, confirmation of induction of the mailing from the postal service induction site.

10. The method according to claim 9, wherein the confirmation of induction includes an actual piece count of the mailing and an actual cost of the mailing as determined by the induction site.

11. The method according to claim 9, further comprising:

providing the notification of induction of the mailing received from the postal service induction site to a third party.

12. The method according to claim 11, wherein the third party is the mailer that requested the mailing.

13. The method according to claim 12, wherein the third party is a lettershop that prepared the mailing.

14. The method according to claim 1, wherein after the step of receiving a request, the method further comprises:

requesting authorization from the mailer from which the request was received for the payment service to provide payment to the postal service for the mailing.

15. The method according to claim 14, wherein the step of requesting authorization further comprises:

providing a not-to-exceed price for the mailing to the mailer.

16. The method according to claim 15, wherein the not-to-exceed price is based in part on discrepancies between estimated costs of prior mailings and actual costs of the prior mailings.

17. The method according to claim 14, wherein after authorization for payment has been received the method further comprises:

processing the information related to the mailing.

18. The method according to claim 17, wherein the step of processing further comprises:
  generating a payment authorization number associated with the mailing, the payment authorization number being linked with the information related to the mailing.

19. The method according to claim 18, wherein the step of providing the information related to the mailing to a postal service induction site further comprises:
  receiving the payment authorization number from the postal service induction site; and
  providing the information related to the mailing that is linked to the payment authorization number to the postal service induction site.

20. The method according to claim 17, wherein the step of processing further comprises:
  storing the information related to the mailing in a location identified by information related to the postal service induction site and a permit imprint number for the mailing.

21. The method according to claim 20, wherein the step of providing the information related to the mailing to a postal service induction site further comprises:
  receiving the information related to the postal service induction site and the permit imprint number for the mailing from the postal service induction site; and
  providing the information stored in the location identified by the information related to the postal service induction site and the permit imprint number for the mailing to the postal service induction site.

22. A method for a payment service to provide payment to a postal service for permit mail inducted by the postal service under a permit imprint number assigned to a mailer, the method comprising the steps of:
  establishing a master payment account with the postal service to pay for permit mail inducted by the postal service under a plurality of different permit imprint numbers issued to a plurality of different mailers;
  establishing a mailer account for each of the plurality of mailers;
  receiving a notification of acceptance of a mailing from a postal service induction site, the mailing being inducted under a permit imprint number issued to one of the plurality of different mailers;
  providing payment to the postal service for the mailing from the master payment account; and
  removing funds for the mailing from the mailer account associated with the mailer to which the permit imprint number was issued.

23. The method according to claim 22, wherein the at mailer account includes an interest bearing deposit account.

24. The method according to claim 22, wherein the at mailer account includes a non-interest bearing deposit account.

25. The method according to claim 22, wherein the mailer account includes a credit account.

26. The method according to claim 22, wherein the master payment account is a Centralized Account Processing System account.

27. The method according to claim 22, further comprising:
  transferring at least a portion of the funds removed from the mailer account to the master payment account.

28. A method for a postal service to induct permit mail and receive payment for the inducted permit mail comprising the steps of:
  establishing a master payment account for a permit payment aggregator, the permit payment aggregator having control of payment for mail inducted by the postal service under a plurality of different permit numbers issued to a plurality of different mailers;
  receiving a mailing for induction at a postal service induction site under one of the plurality of permit numbers;
  communicating with the permit payment aggregator to receive information related to the mailing, the information including criteria for the mailing;
  determining if the mailing received for induction meets the criteria included in the information related to the mailing received from the permit payment aggregator;
  accepting the mailing for induction if the mailing received for induction meets the criteria included in the information related to the mailing received from the permit payment aggregator; and
  if the mailing is accepted, debiting the master payment account of the permit payment aggregator for payment for the mailing.

29. The method according to claim 28, wherein the step of communicating further comprises:
  providing information related to the postal service induction site where the mailing is received and the permit number to the permit payment aggregator, and in response receiving the information related to the mailing.

30. The method according to claim 28, wherein the criteria for the mailing includes at least one of a postal service induction site where the mailing will be inducted, a permit number under which the mailing will be inducted, a range of dates during which the mailing will be inducted, a number of pieces included in the mailing, an estimated cost of the mailing, and a return address on the mailing.

31. The method according to claim 28, wherein the step of determining further comprises:
  verifying the mailing received for induction; and
  comparing the verified mailing to the criteria for the mailing.

32. The method according to claim 28, further comprising:
  providing an actual piece count and an actual cost of the mailing to the permit payment aggregator.

33. The method according to claim 28, further comprising:
  providing confirmation of debiting of the master payment account to the permit payment aggregator.

34. The method according to claim 28, wherein the master payment account is a Centralized Account Processing System account.

35. The method according to claim 28, further comprising:
  rejecting the mailing if the mailing received for induction does not meet the criteria included in the information related to the mailing received from the permit payment aggregator.

36. The method according to claim 35, further comprising:
  receiving updated criteria for the mailing from the permit payment aggregator;
  determining if the mailing received for induction meets the updated criteria received from the permit payment aggregator;
  accepting the mailing for induction if the mailing received for induction meets the updated criteria received from the permit payment aggregator; and if the mailing is accepted, debiting the master payment account of the permit payment aggregator for payment for the mailing.

37. The method according to claim 28, wherein the step of receiving a mailing further comprises:
receiving a payment authorization number associated with the mailing.

38. The method according to claim 37, wherein the step of communicating further comprises:
providing the payment authorization number to the permit payment aggregator, and in response receiving the information related to the mailing.

39. A method for a mailer to pay for permit mail comprising the steps of:
establishing a mailer account with a permit payment aggregator for payment of permit mail, the permit payment aggregator maintaining a master payment account with a mail carrier for payment of permit mail inducted by the mail carrier under a plurality of different permit numbers issued to a plurality of different mailers; and
transferring control of payment for mail inducted under a permit number issued to the mailer to the permit payment aggregator,
wherein payment for a mailing inducted under a permit number issued to the mailer is made from the master payment account of the permit payment aggregator and funds for the mailing are not debited from the mailer account until after a notification of induction is received.

40. The method according to claim 39, wherein the step of establishing a mailer account further comprises:
establishing an interest bearing deposit account with the permit payment aggregator.

41. The method according to claim 39, wherein the step of establishing a mailer account further comprises:
establishing a non-interest bearing deposit account with the permit payment aggregator.

42. The method according to claim 39, wherein the step of establishing a mailer account further comprises:
establishing a credit account with the permit payment aggregator.

43. The method according to claim 39, further comprising:
requesting the permit payment aggregator to make a payment for a mailing, the request including information related to the mailing; and
authorizing the permit payment aggregator to pay for the mailing.

44. The method according to claim 43, wherein the information related to the mailing includes at least one of a postal service induction site where the mailing will be inducted, a permit number under which the mailing will be inducted, a range of dates during which the mailing will be inducted, a number of pieces included in the mailing, an estimated cost of the mailing, and a return address on the mailing.

45. The method according to claim 43, wherein the step of authorizing further comprises:
authorizing a not-to-exceed price for the mailing.

46. The method according to claim 43, wherein after the step of authorizing, the method further comprises:
receiving a payment authorization number generated by the permit payment aggregator, the payment authorization number being linked to the information related to the mailing.

47. The method according to claim 43, wherein after the step of authorizing the method further comprises:
delivering the mailing to an induction site.

48. The method according to claim 43, further comprising:
revising the information related to the mailing.

49. A system for payment of permit mail comprising:
a permit payment aggregator having authority to provide payment to a postal service for permit mail inducted by the postal service under a plurality of different permit imprint numbers for a plurality of different mailers,
at least one associated mailer account maintained by the permit payment aggregator for each of the plurality of different mailers; and
a master payment account maintained by the permit payment aggregator, the master payment account being used to pay the postal service for mailings inducted under each of the plurality of different permit imprint numbers for the plurality of different mailers,
wherein payment for a mailing inducted under a respective permit imprint number issued to a mailer is made from the master payment account of the permit payment aggregator and funds for the mailing are not removed from the at least one associated mailer account for the mailer until after a notification of induction is received from the postal service.

50. The system according to claim 49, wherein the at least one associated mailer account includes an interest bearing deposit account.

51. The system according to claim 49, wherein the at least one associated mailer account includes a non-interest bearing deposit account.

52. The system according to claim 49, wherein the at least one associated mailer account includes a credit account.

53. The system according to claim 49, wherein the master payment account is a Centralized Account Processing System account.

54. The system according to claim 49, wherein the permit payment aggregator provides notification of induction of the mailing by the postal service to the mailer.

55. The system according to claim 49, wherein the permit payment aggregator further comprises:
a payment authorization number system to generate a payment authorization number, the payment authorization number being linked to information related to the mailing, the payment authorization number being provided to a postal service induction site where the mailing will be inducted.

56. The system according to claim 55, wherein the information related to the mailing includes at least one of a postal service induction site where the mailing will be inducted, a permit number under which the mailing will be inducted, a range of dates during which the mailing will be inducted, a number of pieces included in the mailing, an estimated cost of the mailing, and a return address on the mailing.

57. The system according to claim 55, wherein the postal service induction site communicates with the permit payment aggregator and provides the payment authorization number to the permit payment aggregator, and in response to receiving the payment authorization number the permit payment aggregator provides the information related to the mailing to the postal service induction site.

58. The system according to claim 49, wherein the permit payment aggregator stores information related to the mailing in a location identified by a postal service induction site and the permit number for the mailing.

59. The system according to claim 58, wherein the information related to the mailing includes at least one of a postal service induction site where the mailing will be inducted, a permit number under which the mailing will be inducted, a range of dates during which the mailing will be inducted, a number of pieces included in the mailing, an estimated cost of the mailing, and a return address on the mailing.

60. The system according to claim 58, wherein the postal service induction site communicates with the permit payment aggregator and provides the permit number to the permit payment aggregator, and in response to receiving the permit number the permit payment aggregator provides the information related to the mailing to the postal service induction site.

61. A method for a payment service to pay a postal service for permit mail comprising the steps of:

establishing a master payment account with a postal service to pay for permit mail inducted by the postal service under a plurality of different permit imprint numbers issued to a plurality of different mailers;

establishing at least one associated mailer account for each of the plurality of mailers;

receiving, at the payment service, a request for payment for a mailing campaign from one of the plurality of mailers to be inducted under a permit imprint number issued to the mailer, the request including information related to the mailing campaign, the mailing campaign including a plurality of separate mailings;

generating a payment authorization number for each of the plurality of separate mailings, each of the plurality of payment authorization numbers being linked with a portion of the information related to the mailing campaign;

providing the portion of the information related to the mailing campaign linked to a payment authorization number for one of the plurality of mailings to a postal service induction site; and if the one of the plurality of mailings is accepted by the postal service induction site, providing funds to pay for the one of the plurality of mailings from the master payment account.

62. The method according to claim 61, further comprising:

transferring funds to pay for the mailing from the at least one associated mailer account for the mailer to the master payment account.

63. The method according to claim 61, wherein the at least one associated mailer account includes an interest bearing deposit account.

64. The method according to claim 61, wherein the at least one associated mailer account includes a non-interest bearing deposit account.

65. The method according to claim 61, wherein the at least one associated mailer account includes a credit account.

66. The method according to claim 61, wherein the master payment account is a Centralized Account Processing System account.

67. The method according to claim 61, wherein the information related to the mailing campaign includes at least one of a postal service induction site where each of the plurality of mailings will be inducted, a permit imprint number under which each of the plurality of mailings will be inducted, a range of dates during which each of the plurality of mailings will be inducted, a number of pieces included in the mailing campaign, an estimated cost of the mailing campaign, and a return address on each of the plurality of mailings.

68. The method according to claim 61, wherein after the step of receiving a request, the method further comprises:

requesting authorization from the mailer for the payment service to provide payment for the mailing campaign; and receiving authorization from the mailer for payment for the mailing campaign, the received authorization specifying a limit for at least one item of the mailing campaign.

69. The method according to claim 68, further comprising:

maintaining a running total for the information related to the mailing campaign linked to each of the plurality of payment authorization numbers; and comparing the running total to the specified limit for the at least one item of the mailing campaign; and halting generation of payment authorization numbers if the specified limit for the at least one item of the mailing campaign has been reached.

* * * * *